(12) United States Patent
Said et al.

(10) Patent No.: US 8,135,689 B2
(45) Date of Patent: Mar. 13, 2012

(54) PERFORMANCE OPTIMIZED RETRIEVE TRANSFORMATION NODES

(75) Inventors: Baré Said, St. Leon-Rot (DE); Manfred Hirsch, Heidelberg (DE); Guenter Pecht-Seibert, Muhlhausen (DE); Michael Meyringer, Rauenberg (DE); Frank Damaschke, Nussloch (DE); Frank Brunswig, Heidelberg (DE)

(73) Assignee: SAP AG, Walldorf (DE)

( * ) Notice: Subject to any disclaimer, the term of this patent is extended or adjusted under 35 U.S.C. 154(b) by 630 days.

(21) Appl. No.: 12/271,126

(22) Filed: Nov. 14, 2008

(65) Prior Publication Data
US 2010/0125600 A1 May 20, 2010

(51) Int. Cl.
*G06F 17/00* (2006.01)
(52) U.S. Cl. ......................................... 707/703; 705/300
(58) Field of Classification Search .................. 705/75, 705/300–304, 346–348; 707/700–704, 610–619, 707/718–720
See application file for complete search history.

(56) References Cited

U.S. PATENT DOCUMENTS

| | | | |
|---|---|---|---|
| 7,437,676 B1 | 10/2008 | Magdum et al. | |
| 2005/0038784 A1 | 2/2005 | Zait et al. | |
| 2007/0156736 A1 | 7/2007 | Bestgen et al. | |
| 2008/0313728 A1* | 12/2008 | Pandrangi et al. | 726/12 |
| 2009/0083652 A1* | 3/2009 | Krasner et al. | 715/772 |
| 2009/0171736 A1* | 7/2009 | Segler et al. | 705/8 |
| 2009/0300656 A1* | 12/2009 | Bosworth et al. | 719/320 |
| 2010/0082497 A1* | 4/2010 | Biesemann et al. | 705/301 |

OTHER PUBLICATIONS

"European Search Report", dated Nov. 17, 2009, for European Application No. 09012118.7-1527, 6pgs.

* cited by examiner

*Primary Examiner* — Wilson Lee
(74) *Attorney, Agent, or Firm* — Buckley, Maschoff & Talwalkar LLC

(57) ABSTRACT

Systems, methods, computer program code, and means are provided for processing retrieve requests received in a business software system. Pursuant to some embodiments, a retrieve request is processed by identifying that the requested node is a retrieve transformation node, determining that the node relates to one of a currently selected business object and a secondary business object, and retrieving the node data from one of a persistence buffer and a secondary buffer based on the determining.

12 Claims, 3 Drawing Sheets

PERFORMANCE OPTIMIZED RETRIEVE TRANSFORMATION NODES

FIELD

Some embodiments relate to the access and retrieval of business objects in a business process platform. More specifically, some embodiments relate to the usage of retrieve transformation nodes for business objects within a business process platform.

BACKGROUND

Entities are increasingly reliant on computer software systems to operate and manage processes and data. Many entities use business process software and platforms to store, access, retrieve and utilize data. Business process software systems use "business objects" to represent real-world items used during the transaction of business. For example, a business object may represent a business document such as a sales order, a purchase order, or an invoice. A business object may also represent items such as a product, a business partner, or a piece of equipment.

A business object may include business logic and/or data having any suitable structure. The structure of a business object may be determined based on the requirements of a business scenario in which the business object is to be deployed. A business solution for a particular business scenario may include many business objects, where the structure of each business object has been determined based on the requirements of the particular business scenario.

Many business processes use business objects that include attributes or information that is spread or used across multiple business object nodes. For example, in a business process related to managing sales orders, one business object may represent data associated with sales orders, including a sales order identifier, a customer identifier, a customer phone number, etc. The customer identifier and phone number may be used by other business objects in addition to the sales order business object. In a typical user interface, a screen may be presented to a user to perform certain business tasks (e.g., such as to update or enter information associated with a sales order). A typical screen for such a task may contain data entry or selection fields with data elements or attributes belonging to several different business objects.

As a result, the attributes or data needed to create and update the screen requires consulting multiple business object nodes. Retrieving each of those attributes requires multiple disk or memory access operations. Such operations are expensive in terms of processing and operation overhead. The problem can be exacerbated when attributes must be accessed which are not shown on the screen. In general, such operations require substantial processing and operation overhead.

It would be desirable to reduce such processing and operation overhead, and reduce the number of operations required to access certain attributes which are shared among different screens. It would further be desirable to ensure that such operations do not affect the editing or writing of those attributes.

DETAILED DESCRIPTION

Figure 1:
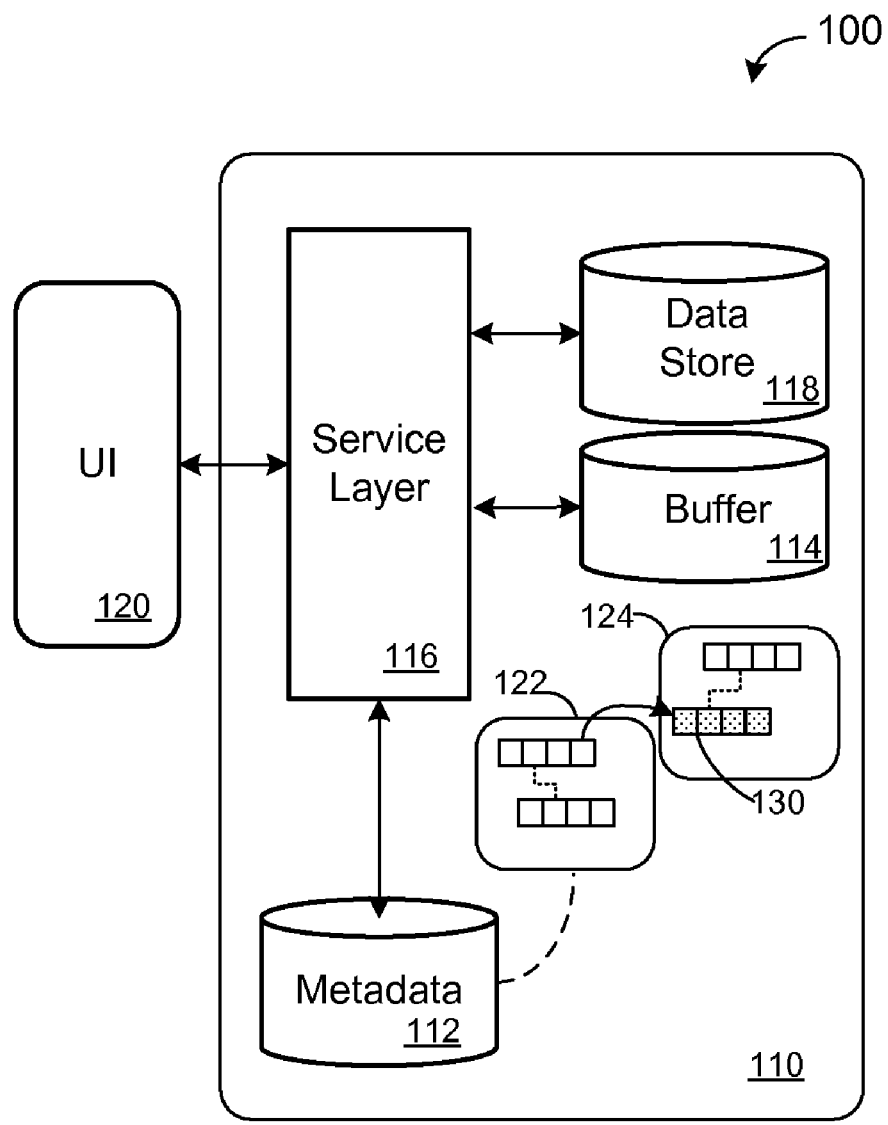
FIG. 1 is a block diagram of components to associate a primary business object with data in a secondary business object according to some embodiments.

FIG. 1 is a block diagram of system 100 according to some embodiments. System 100 includes business process platform 110 and user interface 120. Generally, business process platform 110 may provide services to user interface 120 according to some embodiments. Business process platform 110 may comprise an SAP application platform based on SAP Netweaver®, but is not limited thereto. In this regard, FIG. 1 represents a logical architecture for describing processes according to some embodiments, and actual implementations may include more or different components arranged in other manners.

Business process platform 110 may provide services based on business objects as described above. Metadata 112 may include information defining the structure and attributes of these business objects such as business object 122 and business object 124. A service layer 116 may use metadata 112 to access and manipulate business object data stored in data store 118. Pursuant to some embodiments, a secondary buffer 114 is also provided to temporarily store certain node instances, allowing their fast access without need for traversing multiple nodes.

Pursuant to some embodiments, data within one or more of the business objects (such as objects 122 or 124) are comprised of data from (or shared with) other business objects, attributes of those objects (or nodes) may be retrieved from a retrieve transformation node ("RTN") such as node 130 of business object 124. Pursuant to some embodiments, RTNs are used to provide fast access to specific data sets of a business object, and are composed of redundant data from other nodes of the same business object. RTNs are classified by having their own business object node category code and are, in some embodiments, separated from other or core business object nodes. The use of RTNs to allow fast and efficient access to data will be described further below.

Service layer 116 may support requests from other business objects, other applications, or user interfaces. For example, an operator (e.g., a user) may manipulate user interface 120 to interact with service layer 116 according to some embodiments. Such interactions may include requesting business object views, modifying business object data, and defining business object views. User interface 120 may be displayed by any suitable device. For example, the device may include any necessary software to support a proprietary interface (e.g., a proprietary client application) or execution engine (e.g., a Web browser). A device to display the user interfaces is capable of communication (including sporadic communication—e.g., mobile devices) with business process platform 110.

To illustrate features of some embodiments, an illustrative (but not limiting) example will be used. In the illustrative example, an operator (such as an authorized user of data stored within a business software system) interacts with a user interface 120 to access data stored in a business platform system 110. The user interface 120 includes a number of data entry and data interaction screens which allow the user to interact with data in the system 110. In the illustrative example, the user is interacting with the system 110 to access data associated with sales orders. Each sales order includes a number of elements of data, such as a sales order identifier, sales order details, and information associated with the customer who placed the sale. Some of this information is stored in a sales order business object (e.g., such as business object 122). Some of the information is spread across several business object item nodes (e.g., such as the customer information—which may be used for other screens or items). Embodiments of the present invention, as will be described herein, allow the fast and efficient access of this data without requiring multiple accesses of data.

Figure 2:
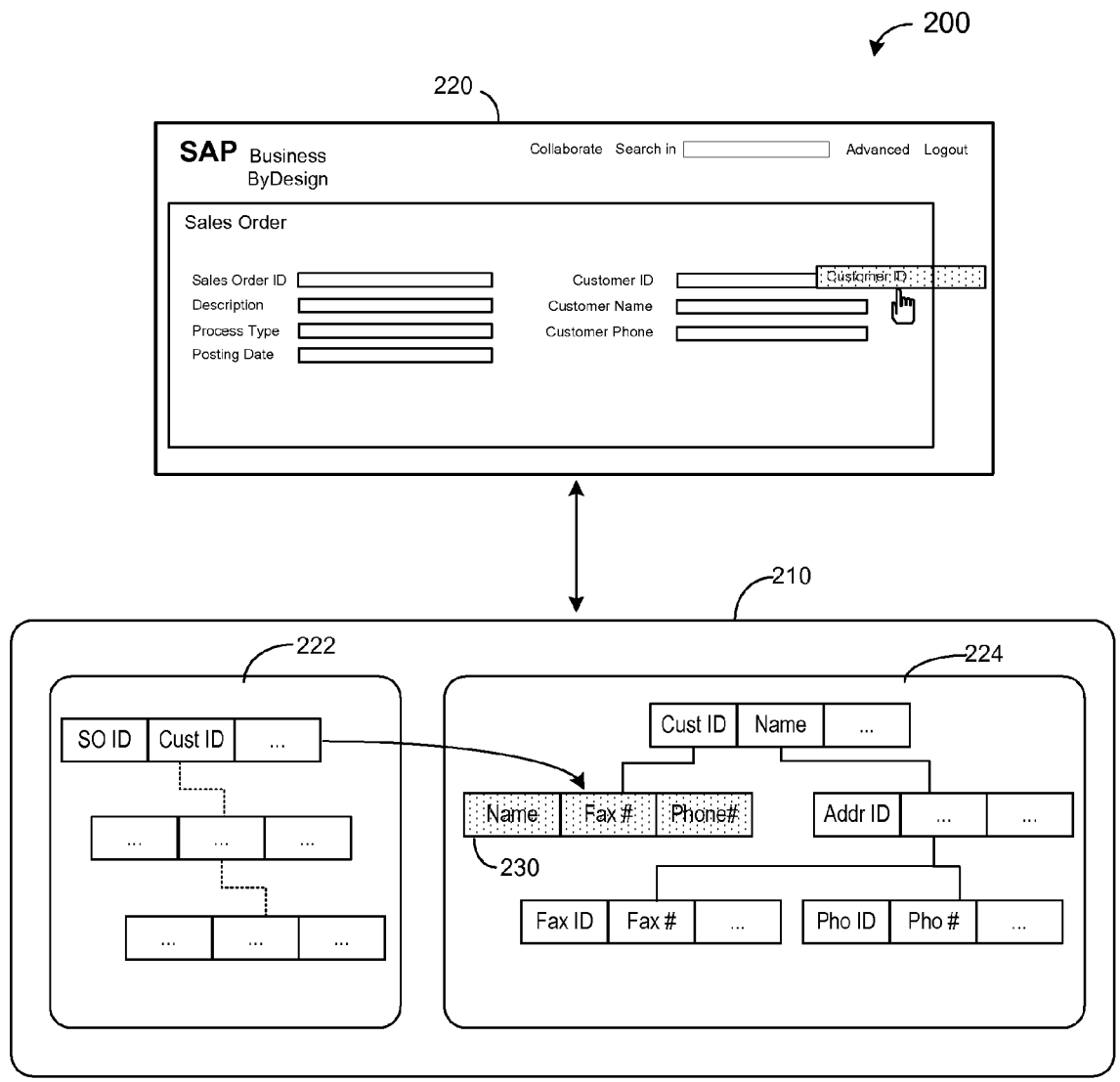
FIG. 2 is a view of components including a user interface for accessing data using a retrieve transformation node according to some embodiments.

FIG. 2 illustrates a system 200 including a user interface 220 according to some embodiments. A user may access user interface 220 through a user interface adaptation dialog provided by service layer 116 (of FIG. 1). The user interface 220 allows the user to retrieve and access data associated with a business object (such as the sales order business object introduced in the illustrative example). In the illustrated user interface 220, a user is provided with navigational and data access options relating to sales orders in a business system. The user interacts with the user interface or screen to enter, edit or view data associated with different sales orders. Some of the data elements that make up the sales order business object include data that is, pursuant to embodiments of the present invention, retrieved using an RTN to reduce processing overhead.

As shown, for example, the data associated with a customer identifier may be retrieved or accessed using an RTN. For example, if a user selects to view (but not, in some embodiments, edit or change) data associated with different customer identifiers, the request is transmitted to system 210 and causes data to be accessed from an RTN (shown as the shaded elements 230 of business object 224). Processing efficiencies are realized when access to the RTN is governed as follows.

As an initial matter, pursuant to some embodiments, RTNs are used when data sets of a business object (such as the sales order business object discussed above) are required frequently in several business scenarios (e.g., if the data sets are frequently accessed via multiple screens or forms), are spread over several business object item nodes (such as in the sales order business object), are not supposed to be modified or edited during a transaction, and if it is possible to reduce the cardinality of the item nodes in order to integrate the attributes into one RTN instance. If these characteristics are met in a given transaction, RTNs pursuant to embodiments of the present invention may allow fast and efficient access to data without multiple data accesses as was used in prior approaches.

Pursuant to some embodiments, the access to an RTN may be made using an alternative key. For example, the alternative key may be the same key as the key of the core business object node the RTN is primarily related to. Referring to the sales order example of FIG. 2, the key of the RTN including customer information may be the same as the customer business object 224. In this manner, if the RTN provides access to data related to the entire business object instance, the RTN shall have the same alternative key as the business object root node. Further, if the RTN is related to a business object item (such as the sales order business object 222 of FIG. 2), the RTN may have the same alternative key as the item node. Using this alternative key, any service consumer (such as a retrieve request made via the service layer 116) is able to obtain the node identifier of an RTN instance and retrieve the data from the RTN instance.

In situations where a primary business object (such as the sales order business object 222) references a secondary business object with an RTN (such as the RTN 230 of the customer object 224) an additional cross business object foreign key may be used to navigate directly to the RTN. Pursuant to some embodiments, this additional association is provided to allow user interface and backend service adaptation such that an RTN may be accessed directly. The result is a system and method which allows a user (or data consumer) to access and display data of a secondary business object with optimal performance.

As shown in FIG. 2 (with further reference to FIG. 1), a user may cause the initiation of a retrieve request by interacting with the screen 220. As shown, for example, when the user attempts to retrieve data associated with a customer identifier related to a sales order, a retrieve request for data (the customer identifier) may be created by the interface service layer and metadata (items 116 and 112 of FIG. 1). If the requested data is associated with an RTN, the RTN data is retrieved based on the metadata (e.g., in the illustrated example, where the RTN data is associated with a secondary business object 224, the RTN is accessed via a cross business object association involving an additional cross business object foreign key). In some situations, as will be described below, the data may be present in a persistent data store (such as the data store 118). In other embodiments, the data may be present in (and retrieved from) a secondary data store such as a secondary buffer (item 114 of FIG. 1).

The data is then quickly and efficiently retrieved for display to the user. In prior approaches, multiple associations and reads may have been required to retrieve the data. If the data is not associated with an RTN pursuant to the present invention, or is not otherwise available in the secondary buffer or the persistence data store, a normal retrieval request (that may traverse nodes) may be issued to retrieve the requested data.

For each RTN created pursuant to the present invention, metadata 112 may include an RTN key as the item node. Metadata 112 may also include a technical (e.g., ABAP) name of the node and each field.

Figure 3:
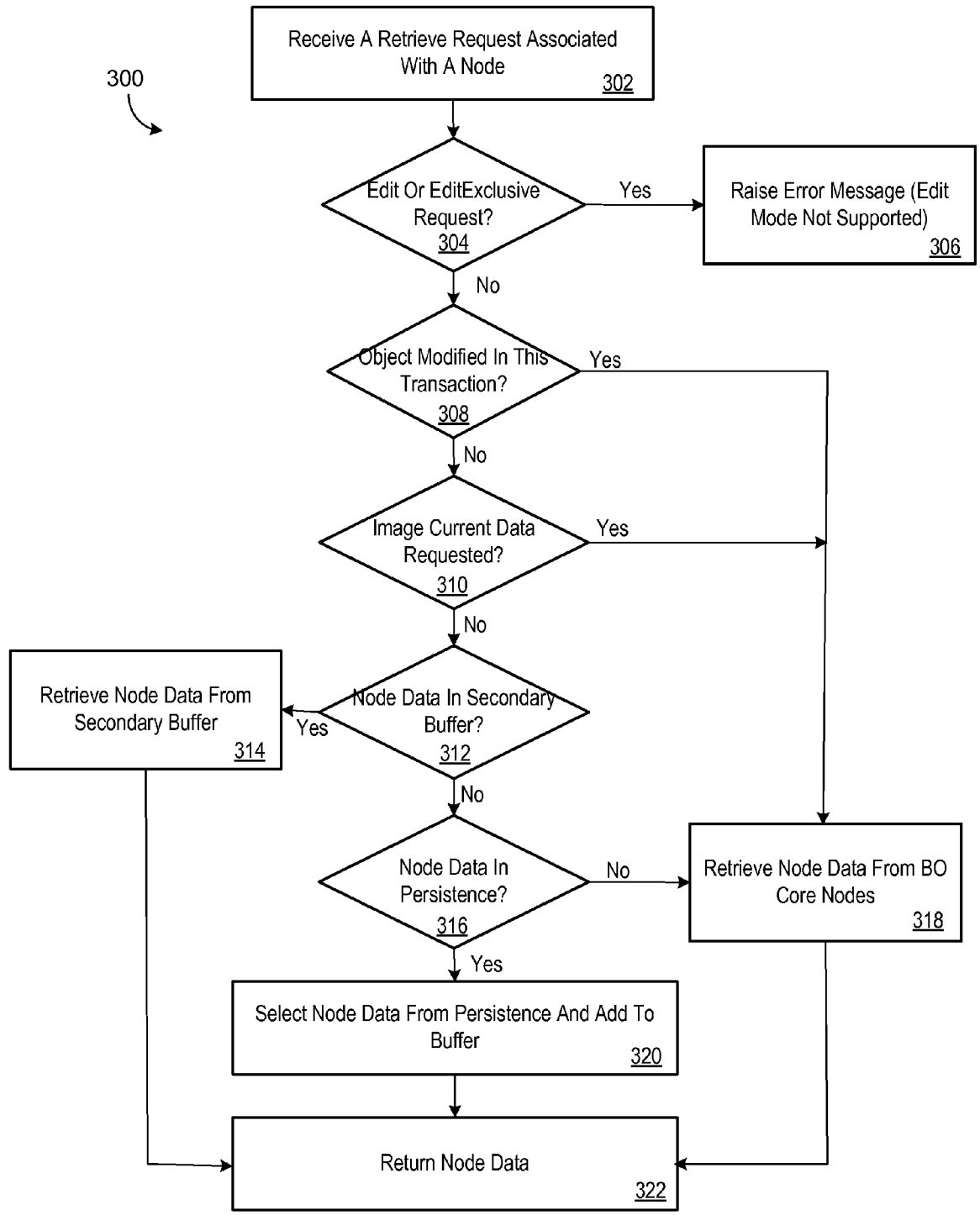
FIG. 3 is a flow diagram of a process according to some embodiments.

FIG. 3 is a flow diagram of a retrieve process 300 to support retrieval of performance optimized retrieve transformation nodes pursuant to some embodiments of the present invention. Retrieve rocess 300 may be executed by system 100 (of FIG. 1). Retrieve process 300 may be executed by systems differing from system 100, and system 100 is not limited to the execution of retrieve process 300.

A retrieve process 300 pursuant to some embodiments begins at 302 where system 100 receives or detects a retrieve request associated with a node. As discussed above, the retrieve request may be initiated, for example, by an authorized user interacting with a business software system 110 via a user interface 120 by requesting information associated with a business object (e.g., such as the sales order business object discussed above). Upon receipt of the retrieve request, the system 110 determines (at 304) whether the request is a retrieve request, or an edit (or edit exclusive) request. In the event that the request is a request to edit or modify data associated with a node, processing continues at 306 where an error message is raised to indicate that editing of the object is not permitted during a retrieve request of an RTN. Pursuant to some embodiments, performance optimized RTNs are accessible only during retrieve requests which do not involve a request to edit or modify a node. Embodiments utilize such a restriction to ensure that performance optimized RTNs are readily accessible, and retrievable with few node traversals.

If processing at 304 determines that the request does not involve a request to edit or modify the node data, processing continues at 308 where a further determination is made whether the requested object has been modified in the present transaction. If the requested object has been modified, processing continues at 318 where the node data is retrieved from the relevant business object using standard retrieval processing (that is, the node data is not retrieved from the RTN, instead, it is retrieved by traversing the business objects as normal). In such situations, processing completes at 322 where the retrieved node data is returned to the requesting application to complete the retrieval request.

If processing at 308 indicates that the requested object has not been modified during the present transaction, processing continues at 310 where a determination is made whether the requested data involves image current data. If so, retrieval of the data using the RTN is not permitted, and processing continues at 318 where the node data is retrieved from the relevant business object using standard retrieval processing.

If processing at 310 indicates that the requested data does not involve current image data, processing continues at 312 where a determination is made whether the requested data is contained in a secondary buffer. Pursuant to some embodiments, a secondary buffer is used to optimize the performance of repeated retrieval of the same node instances. The secondary buffer stores node instances with type of node elements proxy structure. Buffering the node instance data structure avoids the need to obtain the data from a transactional buffer or persistence buffer (and then mapping the application or database structure to the node structure). In situations in which RTN attributes are collected from more than one core business object nodes (and thereby are spread over multiple application or database structures), this ability to retrieve data from a secondary buffer increases access speed (and reduces overhead) substantially. Pursuant to some embodiments, the secondary buffer is configured such that the data in the buffer are invalidated during transactions in which the data of any core business object is modified or changed.

If processing at 312 indicates that the requested data is in the secondary buffer, processing continues at 314 where the requested node data is retrieved from the secondary buffer. Processing then continues at 322 where the node data is returned to the requesting application (e.g., such as the user interface 120) to complete processing.

If processing at 312 indicates that the requested node data is not in the secondary buffer, processing continues at 316 where a determination is made whether the requested node data is in the persistence buffer (e.g., such as data store 118). If the node data is not available in the persistence buffer, processing continues at 318 where the node data is retrieved from the relevant business object using standard retrieval processing. Processing continues at 322 where the requested node data is returned to the requesting application to complete the retrieval request.

If processing at 316 indicates that the requested node data is available in the persistence buffer, processing continues at 320 where the node data is retrieved from the persistence buffer and the data is added to the secondary buffer (to speed further access of the data by future retrieval requests). Processing completes at 322 where the requested node data is returned to the requesting application (e.g., such as the user interface 120) to complete the retrieval request.

Pursuant to some embodiments, RTNs pursuant to the present invention are modeled and established in situations where the data to be retrieved is not always associated with a cardinality of 1:1 to their parent or root node, respectively. In situations in which the cardinality is 1:1, the access to an RTN may be provided using an alternative key as described above. In these scenarios, separate RTNs may be modeled for different usage scenarios, and the RTN instance may always contain data of dedicated core node instances. The RTN is identified (as described above) with the alternative key of the related core business object node.

In situations where the cardinality is not 1:1 (instead, the cardinality is n), the same RTN may still be used in several usage scenarios. Further, for several item node instances, there may be corresponding RTN instances, which need to be identified or filtered by the service consumer (e.g., such as the service layer 116 of FIG. 1). In these situations where the cardinality is n, no alternative key may exist for an RTN, but it is possible to identify the requested RTN instance as a specialization or with filter criteria. Pursuant to some embodiments, the filtering may be performed using filtered specialization associations (e.g., established in the metadata 112 of FIG. 1). The RTN may be modeled as a sub-node of another (related) RTN which has a cardinality of 1 and has an alternative key (as described above). Additional filters or relationships may be established, providing a structure of RTNs that may be used to increase retrieval speed and efficiency.

In either situation (where there is a cardinality of 1:1 or a cardinality of n), RTNs pursuant to some embodiments have the following characteristics which result in performance optimization benefits during retrieve transactions: (1) RTNs are not modeled as normal transformation nodes, (2) RTNS are generally not modifiable (e.g., they may not be created, updated or deleted by a service process), (3) RTNs are read only nodes, (4) RTNs do not have actions or queries associated with them, and (5) RTNs which are directly subordinated to a core business object node are identified with an alternative key. The result is a system with improved performance and reduced processing overhead during retrieve transactions.

Those skilled in the art will appreciate that while a particular type of retrieve request has been described herein (one initiated by user interaction with a user interface) that other retrieve requests may also benefit from features of the present invention by enjoying faster and more efficient retrieval of certain node data.

Each system described herein may be implemented by any number of devices in communication via any number of other public and/or private networks. Two or more of devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip™ disk, magnetic tape, and solid state RAM or ROM memories. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A computer-implemented method comprising:
receiving a retrieve request for node data associated with a node of a business object data model;
identifying, by the computer, said node is a retrieve transformation node comprising a set of data from multiple other nodes of said business object;
determining, by the computer, that the said node relates to one of a currently selected business object and a secondary business object;
determining, by the computer, that said node data is not modified during a current transaction;

determining, by the computer, that said retrieve request does not include a request to edit or modify said node data; and retrieving, by the computer, said node data associated with said node from one of a persistence buffer and a secondary buffer.

2. The method of claim 1, wherein said retrieving said node data associated with said node from said persistence buffer further comprises:

adding said node data to said secondary buffer.

3. The method of claim 1, wherein said retrieving further comprises:

retrieving said node data associated with said node from a business object node based on an alternative key associated with said node.

4. The method of claim 1, wherein said retrieving said node data associated with said node from said persistence buffer further comprises:

accessing said node data using an alternative key, said alternative key equal to an identifier of a root node of said currently selected business object.

5. The method of claim 1, wherein said retrieving said node data associated with said node from said secondary buffer further comprises: accessing said node data using a cross business object foreign key.

6. The method of claim 1, wherein said retrieve request is received from a user interface based on a selection of a business object by a user interacting with said user interface.

7. A non-transitory medium storing processor-executable program code, the medium comprising:

program code to receive a retrieve request for node data associated with a node of a business object data model;

program code to identify said node is a retrieve transformation node comprising a set of data from multiple other nodes of said business object;

program code to determine that said node relates to one of a currently selected business object and a secondary business object;

program code to determine that said node data is not modified during a current transaction;

program code to determine that said retrieve request does not include a request to edit or modify said node data; and program code to retrieve said node data associated with said node from one of a persistence buffer and a secondary buffer based on said determining.

8. The medium claim 7, wherein said program code to retrieve said node data associated with said node from said persistence buffer further comprises:

program code to add said node data to said secondary buffer.

9. The medium of claim 7, wherein said program code to retrieve said node data associated with said node further comprises:

program code to retrieve said node data associated with said node from a business object node based on an alternative key associated with said node.

10. The medium of claim 7, wherein said program code to retrieve said node data associated with said node further comprises:

program code to access said node data using an alternative key, said alternative key equal to an identifier of a root node of said currently selected business object.

11. The medium of claim 7, wherein said program code to retrieve said node data associated with said node from said secondary buffer further comprises:

program code to access said node data using a cross business object foreign key.

12. The medium of claim 7, further comprising:

program code to receive said retrieve request from a user interface based on a selection of a business object by a user interacting with said user interface.

* * * * *